US008167091B2

(12) United States Patent
Alecu et al.

(10) Patent No.: US 8,167,091 B2
(45) Date of Patent: May 1, 2012

(54) OIL SCAVENGE SYSTEM HAVING CHURNING DAMPER FOR GAS TURBINE ENGINES

(75) Inventors: Daniel T. Alecu, Toronto (CA); Kenneth Parkman, Georgetown (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 789 days.

(21) Appl. No.: 11/692,287

(22) Filed: Mar. 28, 2007

(65) Prior Publication Data
US 2008/0236951 A1   Oct. 2, 2008

(51) Int. Cl.
*F01D 25/18* (2006.01)
*F16H 57/02* (2006.01)

(52) U.S. Cl. ...................................... 184/6.11; 184/6.12

(58) Field of Classification Search .............. 184/6.11, 184/6.12
See application file for complete search history.

(56) References Cited

U.S. PATENT DOCUMENTS 3,614,257 A * 10/1971 Campbell .................. 415/176
3,788,426 A    1/1974 Hull, Jr.
5,565,094 A * 10/1996 Zoch et al. ................. 210/86
6,330,790 B1 * 12/2001 Arora et al. ................ 60/39.08
6,996,968 B2   2/2006 Peters et al.
7,189,178 B2   3/2007 Weith

FOREIGN PATENT DOCUMENTS

EP   1 544 417 A2   6/2005
JP   59-159712 U   10/1984

OTHER PUBLICATIONS

International Search Report dated Jun. 20, 2008 on corresponding PCT International Application No. PCT/CA2008/000519.
European Search Report dated Oct. 27, 2010, issued by the European Patent Office on Applicant's corresponding European Patent Application No. 08251128.8-1263 / 1975379.

* cited by examiner

*Primary Examiner* — William A Rivera
*Assistant Examiner* — Robert Reese
(74) *Attorney, Agent, or Firm* — Norton Rose Canada LLP

(57) ABSTRACT

An oil scavenge system of a gas turbine engine in accordance with one embodiment of the present invention, comprises a housing defined about an axis of rotation, the housing confining an air/oil mixture in motion within the housing and defining an oil scavenge area below the axis of rotation. The housing further includes an outlet at a low location of the housing. A churning damper is supported within the housing and is located in the oil scavenge area. The churning damper includes at least one plate, allowing the air/oil mixture in motion to pass over or through the plate only in a peripheral area of the at least one plate to cause flow energy dissipation.

11 Claims, 5 Drawing Sheets

OIL SCAVENGE SYSTEM HAVING CHURNING DAMPER FOR GAS TURBINE ENGINES

TECHNICAL FIELD

The invention relates generally to oil systems for gas turbine engines and more particularly, to an improved oil scavenge system.

BACKGROUND OF THE ART

Gas turbine engines for aircraft typically include a gear box containing a gear train drivingly connected to an engine main shaft and auxiliary components. The gear box is also connected in an oil system of the engines which lubricates and cools the gear train within the gear box. Gear train rotation generates a high velocity and unsteady flow of high density air/oil mixture inside the gear box, which can blast oil off the collecting areas onto the moving parts. The oil collecting and blasting processes within the gear box reach an equilibrium when very little liquid oil is left in the collecting areas. The high density air/oil mixture circulating inside the gear box generates heat by churning, in a manner similar to that of a dynamometer water brake. Baffles are conventionally used around one or more gears within the gear box and are configured for the purpose of deflecting oil blasting away from the collecting areas.

Accordingly, there is a need to provide an improved oil scavenging system to improve oil collecting and reduce heat generated by the churning of the air/oil mixture within the gear box.

SUMMARY OF THE INVENTION

It is therefore an object of this invention to provide an oil scavenge system of a gas turbine engine.

In one aspect, the present invention provides an oil scavenge system of a gas turbine engine which comprises a housing defined about an axis of rotation, the housing confining an air/oil mixture in motion within the housing and defining an oil scavenge area below the axis of rotation, the housing including an outlet at a low location of the housing; and a churning damper supported within the housing and located in the oil scavenge area, the churning damper including at least one plate, allowing the air/oil mixture in motion to pass over or through the plate only in a peripheral area of the at least one plate to cause flow energy dissipation.

In another aspect, the present invention provides an oil scavenge system of a gas turbine engine which comprises a housing defined about an axis of rotation, the housing confining an air/oil mixture in motion within the housing and defining an oil scavenge area below the axis of rotation, the housing including an outlet at a low location of the housing; and means having peripheral edges substantially increased in length relative to a damping surface area defined by the peripheral edges, for causing flow energy dissipation of the air/oil mixture in motion when passing towards the outlet from the damping surface area over the substantially increased peripheral edges, the means being located in the oil scavenge area to separate liquid oil from the air/oil mixture and to discharge the liquid oil through the outlet.

In a further aspect, the present invention provides a gear box of a gas turbine engine which comprises a housing having an outlet for discharging oil contained in the housing; a gear train operationally supported within the housing; and a churning damper supported within the housing and located between at least a part of the gear train and the outlet, the churning damper including a plate with holes extending through a thickness of the plate, the individual holes having a diameter equal to or smaller than the thickness of the plate.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 8 is a cross-sectional view of a plate of the churning damper according to a further embodiment of the present invention, showing the plate having a corrugated configuration; and.

DETAILED DESCRIPTION OF THE PREFERRED EMBODIMENTS

Figure 1:
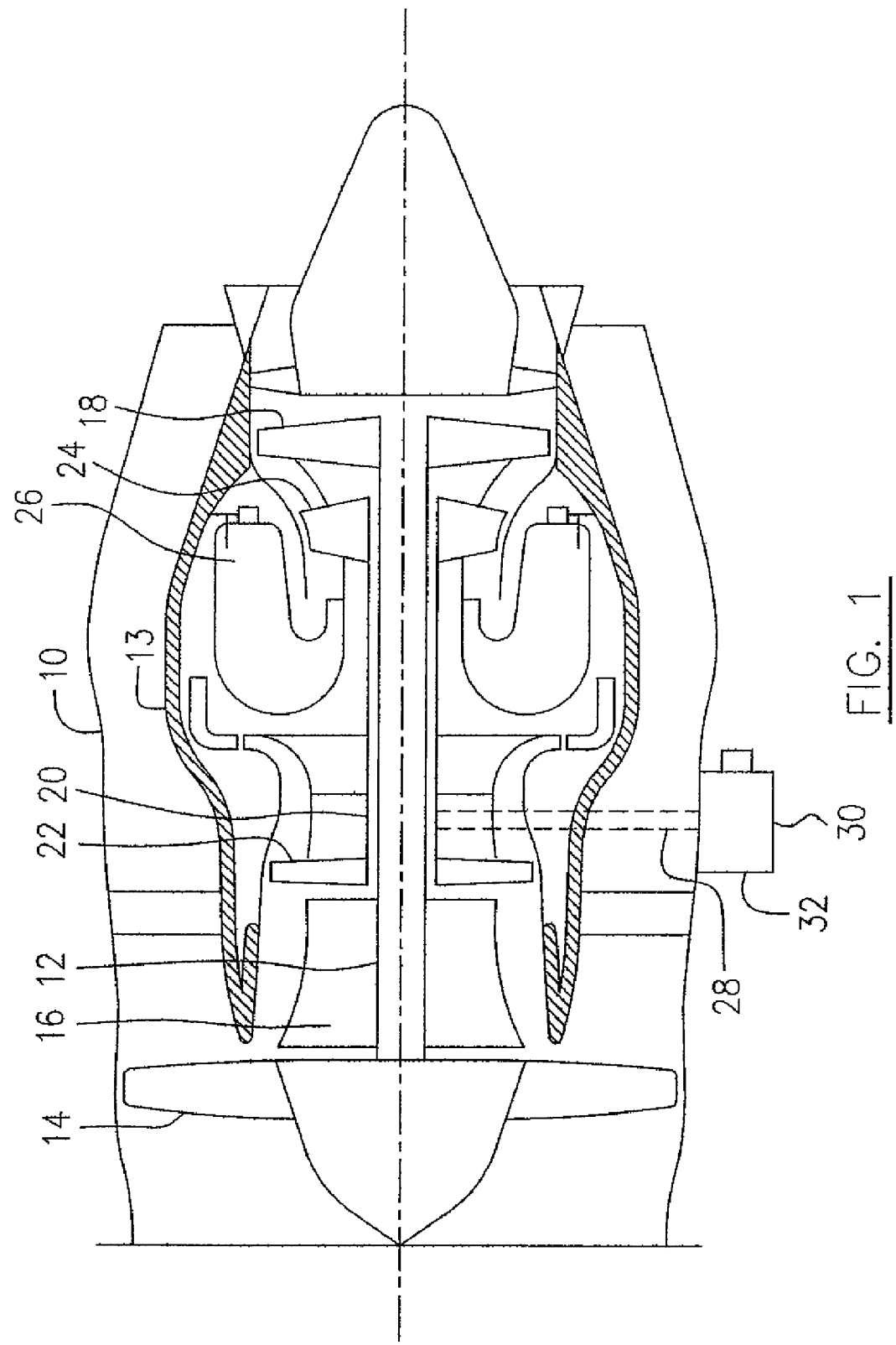
FIG. 1 is a schematic cross-sectional view of a turbofan gas turbine engine as an example illustrating an application of the present invention.

FIG. 1 illustrates a gas turbine engines as an example of the application of the present invention, which includes a housing or nacelle 10, a core casing 13, a low pressure spool assembly seen generally at 12 which includes a fan assembly 14, a low pressure compressor assembly 16 and a low pressure turbine assembly 18 and a high pressure spool assembly seen generally at 20 which includes a high pressure compressor assembly 22 and a high pressure turbine assembly 24. The core casing 13 surrounds the low and high pressure spool assemblies 12 and 20 in order to define a main fluid path (not indicated) therethrough including a combustor 26.

Figure 2:
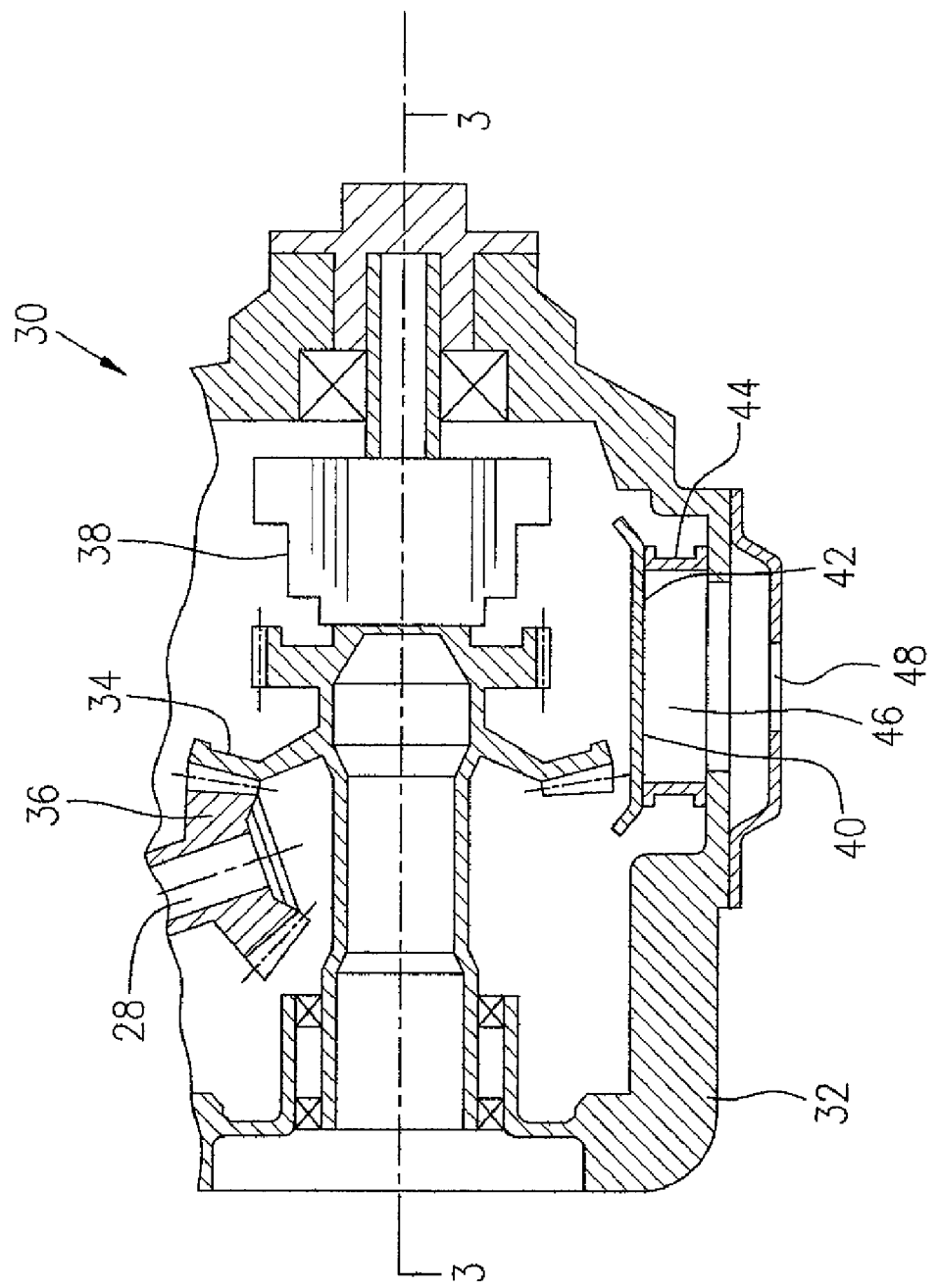
FIG. 2 is a partial and elevational cross-sectional view of a gear box of the gas turbine engine illustrated in FIG. 1, incorporating one embodiment of the present invention to show a churning damper supported within the gear box.

Reference is now made to FIGS. 1 and 2. The gas turbine engine further includes an auxiliary gear box 30 which includes a housing 32 secured to a bottom mounting face (not indicated) of nacelle 10. A gear train (not indicated) is operatively supported within the housing 32. The gear train includes a pair of bevelled gears 34 and 36 to connect a tower shaft 28 which in turn is drivingly connected to the high pressure spool 20. The gear train of the gear box 30 is also drivingly connected to various engine devices such as a pump assembly, a starter generator, etc. (not shown), such that the driving power provided by the high pressure spool 20 is distributed through the gear train of the gear box 30 to said engine devices. The gear box 30 is also connected, for example by tubes, to an oil system of the gas turbine engine. Liquid oil and/or air/oil mixtures collected from bearing compartments (not shown) are delivered into the gear box 30 to cool and lubricate the gear train. The air/oil mixture within the gear box 30 may be further separated for example by an air/oil separator 38 mounted to one shaft of the gear train. The recovered liquid oil is then delivered by the oil scavenging system of the present invention, from the gear box before being reused.

Figure 3:
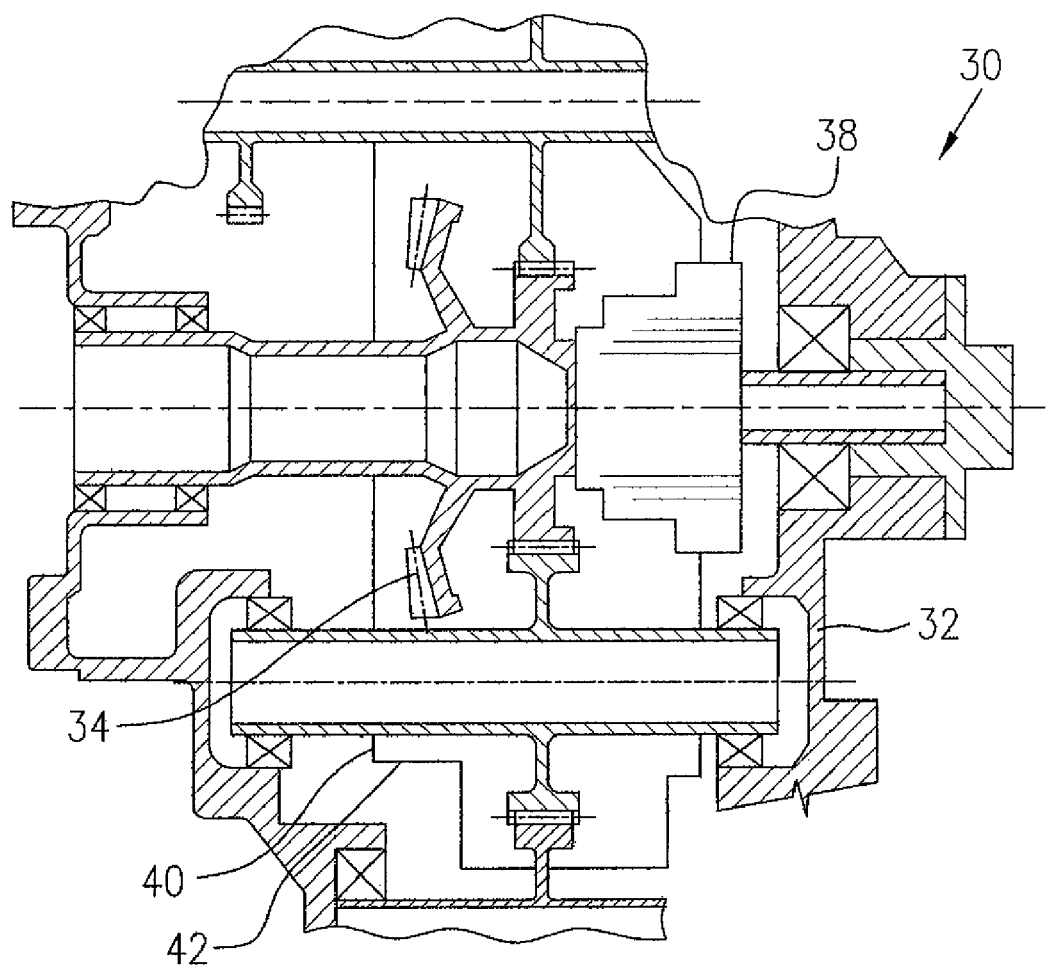
FIG. 3 is a partial cross-sectional view taken along line 3-3 of FIG. 2.
Figure 4:
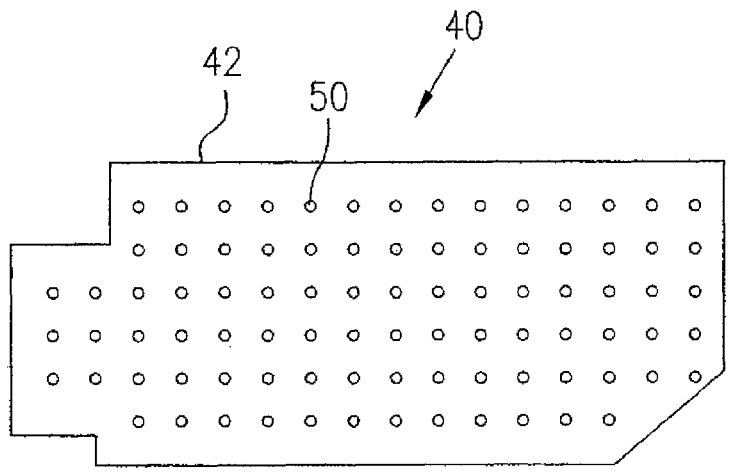
FIG. 4 is a top plane view of the churning damper in accordance with the embodiment of FIGS. 2 and 3, showing a plate of the churning damper having perforations with preferable dimension ratios.

Referring to FIGS. 2-4, a churning damper 40 generally includes a plate 42 supported by for example, a plurality of braces 44 within the housing 32, in accordance with one embodiment of the present invention. The plate 42 may be flat or slightly curved. The plate 42 is mounted to the housing 32 and is located in an oil scavenging area 46 within the housing 32. The oil scavenging area 46 is defined in a lower portion of the housing 32 below the gear train and is in communication with an outlet 48 which is also located in a low part of the housing 32 and is in fluid communication with, for example an oil sump (not shown) of the engine oil system. The plate 42 is dimensioned and shaped to extend between at least a part of the gear train and the outlet 48, but causes no interference with the operation of the gear train. For example, in accordance with the illustration of FIGS. 2 and 3, the plate 42 extends laterally past gear 34 and another co-axially mounted gear (not indicated).

In this embodiment, the plate 42 includes a plurality of holes 50 which are optionally distributed over the substantially entire plate 42. The gear train rotation causes high velocity motion of the air/oil mixture within the housing 32. This high velocity motion of the air/oil mixture results in an unsteady flow of the air/oil mixture within the housing 32, which can blast liquid oil collected on the surfaces of stationary parts of the gear box (which are referred to as the collecting areas) back onto the moving parts of the gear train, thereby increasing the density of the air/oil mixture until the oil collecting and blasting processes result in a density equilibrium when very little liquid oil is left in the collecting area. The dense air/oil mixture circulation inside the gear box 30 generates heat by churning.

The plate 42 located in the oil scavenging area 46, interferes with the flow pattern of the air/oil mixture inside the housing 32, dampening the flow fluctuations and deflecting the flow of air/oil mixture away from the collecting areas. The upper side of the plate 42 forms a damping surface area to collect the oil suspension and flow energy dissipation further occurs as the dampened air/oil mixture passes through the holes 50. A high flow velocity gradient through the holes 50 contributes to the oil suspension coalescing into large particles which separate from the air/oil mixture under gravity. The separated liquid oil collected on the plate 42 falls into and is collected around the outlet 48 from which the liquid oil is then discharged back to the oil system of the engine by the connected sump. The resulting leaner air/oil mixture forms a relatively steady circulation with lower velocity and thus generates less heat and blasts less liquid oil from the collecting areas.

The individual holes 50 in the plate 42 in this embodiment, are preferably designed to have a relatively small diameter and relatively large spaces therebetween, in order to reduce the chance of the high velocity air/oil mixture passing directly through the individual holes 50 upon impinging on the plate 42, without being dampened by the damping surface area of the plate 42. For example, the individual holes 50 may have a diameter equal to or less than the thickness of the plate 42 and the holes 50 are spaced by a distance equal to or greater than three times the diameter of the individual holes 50. The plate 42 should have a thickness such that the plate 42 has enough rigidity to prevent vibration during engine operation when the plate 42 is supported by a limited number of said braces 44.

Figure 5:
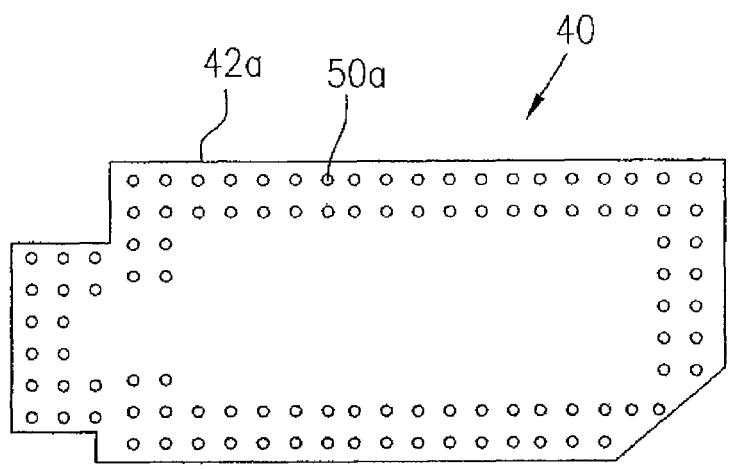
FIG. 5 is a top plane view of a plate of the churning damper according to another embodiment of the present invention, showing a peripheral area of the plate having holes extending through the plate.

In FIG. 5 the churning damper 40 in accordance with another embodiment of the present invention, includes a plate 42a as an alternative to the plate 42 in FIGS. 2-4. Plate 42a includes holes 50a distributed only in a peripheral area of the plate 42a, to form a strip of perforations along peripheral edges of the plate 42a. Therefore, the middle portion of the plate 42a which forms a central blank region prevents the high velocity air/oil mixture from passing through the plate 42a, from the damping surface area (the upper side of the plate 42a) towards the outlet 48 of FIG. 2, and only the perforated peripheral area of the plate 42a allows the air/oil mixture to pass through the plate via the holes 50a and the peripheral edges of the plate 42a. The high velocity impingement of the air/oil mixture on the plate 42a more likely occurs in the middle portion of the plate 42a because of the location of the churning damper 40 within the gear box 30 with respect to the position of the gear train. However, there are no holes in the middle portion of the plate 42a to allow the high velocity air/oil mixture to pass therethrough without being dampened by the damping surface area of the plate 42a. According to this embodiment as depicted in FIG. 5, the central blank region is sized greater than the spacing between the adjacent rows of the holes 50a. It is also depicted that the perforated strip is narrower than the width of the central blank region.

Figure 6:
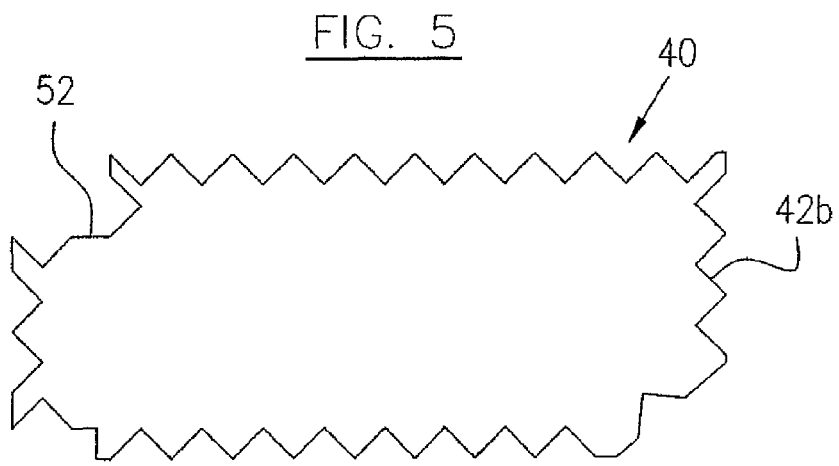
FIG. 6 is a top plane view of a plate of the churning damper according to a further embodiment of the present invention, showing a peripheral area of the plate having increased peripheral edges in a saw-tooth configuration.

In FIG. 6 the churning damper 40 in accordance with a further embodiment of the present invention includes a plate 42b as an alternative to plate 42 in FIGS. 2-4 and to plate 42a of FIG. 5. The plate 42b defines a peripheral area with peripheral edges 52 substantially increased in length relative to the surface area of the plate 42b defined within peripheral edges 52, in contrast to the strip of holes 50a shown in FIG. 5. The substantially increased peripheral edges 52 defined in the peripheral area of plate 42b, which is shown in FIG. 6 as an example, is achieved by peripheral edges 52 being configured in a saw-tooth pattern. The high velocity air/oil mixture inside the gear box of FIGS. 2 and 3 is dampened by the damping surface area (the upper side) of the plate 42b and is directed along the damping surface area to pass over the edges 52, thereby causing flow energy dissipation at the plate edges 52. The saw-tooth configuration substantially increases the length of the peripheral edges 52 of the plate 42b in contrast to, for example, peripheral edges in straight lines as in the plates 42 of FIG. 4 and plates 42a of FIG. 5, thereby causing flow energy dissipation at the edges 52 to be more efficient.

Figure 7:
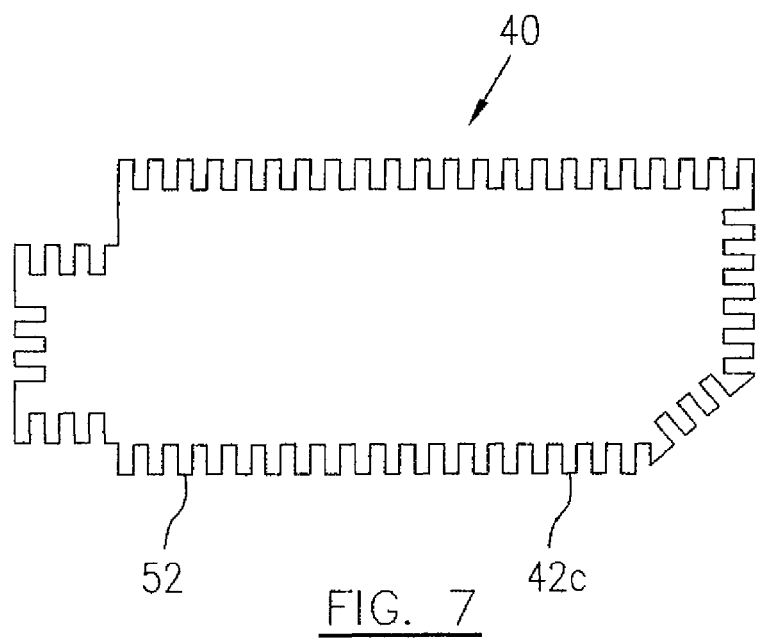
FIG. 7 is a top plane view of a plate of the churning damper according to a further embodiment of the present invention, showing a peripheral area of the plate having increased peripheral edges in a rectangular tooth configuration.

FIG. 7 illustrates a still further embodiment of the present invention in which the churning damper 40 includes a plate 42c. As an alternative to plate 42b of FIG. 6, plate 42c defines a peripheral area with peripheral edges in a rectangular tooth configuration to increase the length of the peripheral edges 52.

Figure 8:
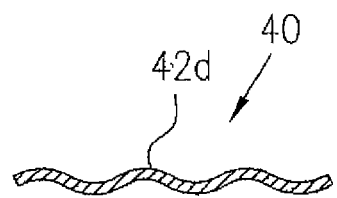

It should be noted that the substantially increased peripheral edges of the plate 42b illustrated in FIG. 6 may be optionally combined with the perforated plate 42 shown in FIG. 4 or the partially perforated plate 42a shown in FIG. 5 to achieve even more efficient energy dissipation. Alternative to plates 42, 42a, 42b and 42c illustrated in the respective FIGS. 4, 5, 6 and 7 which are flat or slightly curved, the plates 42, 42a, 42b and 42c can have a corrugated configuration as in plate 42d, illustrated in FIG. 8. Furthermore, plate 42d may be optionally incorporated with the features of perforations and substantially increased edges 52 as described in the previous embodiments. It should also be noted that the corrugated plate 42d is preferably configured to avoid forming deep grooves which will cause significant accumulation of liquid oil on the damping surface area (the upper side) of the plate 42d.

Figure 9:
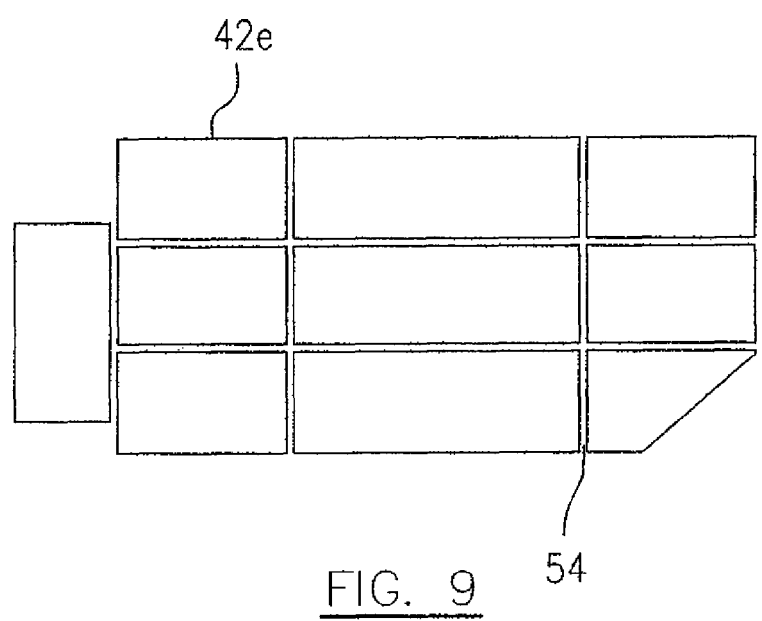
FIG. 9 is a top plane view of a plate of the churning damper according to a still further embodiment of the present invention, showing a multi-plate configuration.

In FIG. 9 the churning damper 40 in accordance with a further embodiment of the present invention includes a plurality of plates 42e which are aligned with one another in one plane, with gaps 54 in combination to form a damping surface area (the upper side of the plates 42e) substantially equivalent to the damping surface area of plates 42, 42a, 42b and 42c described in the previous embodiments. Each of the plates 42e is securely supported within the housing 32 of the gear box 30 of FIGS. 2 and 3. The peripheral edges (not indicated) of the individual plates 42e in combination, form the increased peripheral edges of the churning damper 40. Therefore, the high velocity air/oil mixture inside the gear box of FIGS. 2 and 3, is dampened in the damping surface area of the individual plates 42e and is directed to pass through the gaps 54 such that flow energy dissipation occurs at the peripheral edges of the individual plates 42e. A total length of the peripheral edges of the individual plates 42e is significantly greater than the outer periphery of the churning damper 40, thereby efficiently improving flow energy dissipation.

It should be noted that the features described in the previous embodiments may also be optionally incorporated with the embodiment illustrated in FIG. 9.

The above description is meant to be exemplary only, and one skilled in the art will recognize that changes may be made to the embodiments described without departure from the scope of the invention disclosed. For example, the oil scavenging system of the present invention is described with reference to the embodiments of the gear box of a gas turbine engine. However, the oil scavenging system of the present invention is also applicable to other devices of a gas turbine engine, such as a bearing compartment of an engine shaft. Still other modifications which fall within the scope of the present invention will be apparent to those skilled in the art, in light of a review of this disclosure, and such modifications are intended to fall within the appended claims.

The invention claimed is:

1. An oil scavenge system of a gas turbine engine comprising:
   a housing defined about the axis of rotation of a rotating element, the housing confining an air/oil mixture in motion within the housing and defining an oil scavenge area below the axis of rotation, the housing including an outlet at a low location of the housing; and
   a churning damper supported within the housing and located in the oil scavenge area, the churning damper including at least one plate having a plurality of holes extending through the plate and distributed unevenly over the plate to define a central blank region free from holes extending through the plate in contrast to and surrounded by a peripheral area having said holes with spacing between adjacent rows of the holes smaller than the central blank region for allowing the air/oil mixture in motion to pass through the plate in the peripheral area of the at least one plate to cause flow energy dissipation.

2. The oil scavenge system as defined in claim 1 wherein said plurality of holes form a perforated strip only in the peripheral area, the perforated strip being narrower than a width of the central blank region.

3. The oil scavenge system as defined in claim 2 wherein the perforated strip comprises individual said holes having a diameter equal to or smaller than a thickness of the plate.

4. The oil scavenge system as defined in claim 2 wherein the perforated strip comprises said holes spaced apart one from another in a distance equal to or greater than 3 times a diameter of the respective holes.

5. The oil scavenge system as defined in claim 1 wherein the peripheral area of the plate comprises peripheral edges substantially increased in length relative to a surface area of the plate defined within the peripheral area.

6. The oil scavenge system as defined in claim 1 wherein the plate comprises a corrugated configuration.

7. An oil scavenge system as defined in claim 1 wherein the churning damper comprises a plurality of plates in one plane with gaps between the plates.

8. A gear box of a gas turbine engine comprising:
   a housing having an outlet for discharging oil contained in the housing;
   a gear train operationally supported within the housing; and
   a churning damper supported within the housing and located between at least a part of the gear train and the outlet, the churning damper including a plate having a central blank region free from holes extending through the plate, and a peripheral area surrounding the central blank region, the peripheral area having a plurality of holes extending through a thickness of the plate, the individual holes having a diameter equal to or smaller than the thickness of the plate, with spacing between adjacent holes, the plate extending laterally past co-axially mounted gears of the gear train.

9. The gear box as defined in claim 8 wherein the individual holes are located only in a strip area along a periphery of the plate, the strip area being narrower than the central blank region.

10. The gear box as defined in claim 8 wherein the holes are spaced one from another in a distance equal to or larger than the diameter of the individual holes.

11. The gear box as defined in claim 8 wherein the plate comprises peripheral edges having a saw-tooth configuration.

* * * * *